UNITED STATES PATENT OFFICE.

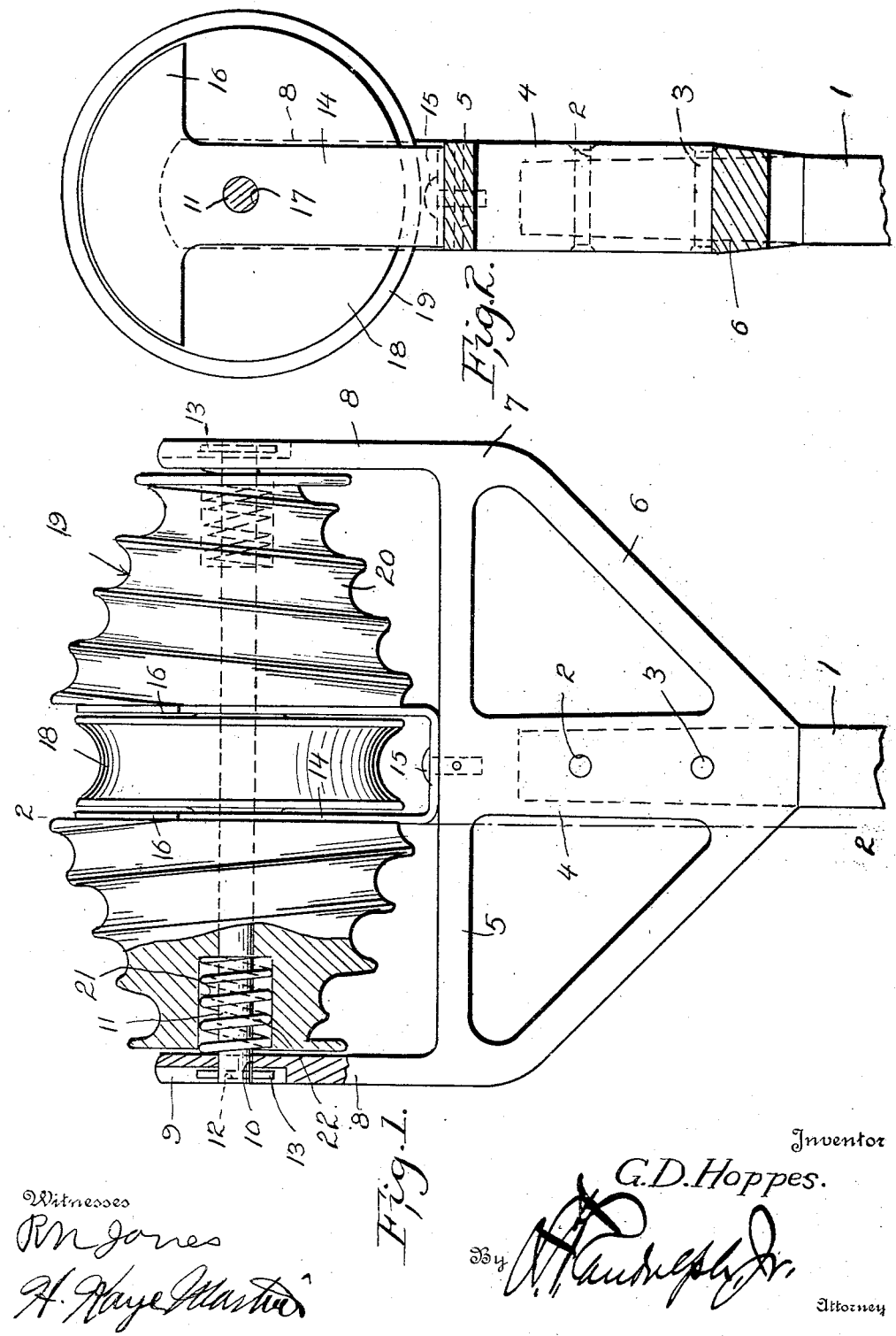

GEORGE D. HOPPES, OF SPRINGFIELD, OHIO.

TROLLEY-REPLACER.

1,136,803.  Specification of Letters Patent.  Patented Apr. 20, 1915.

Application filed November 18, 1913. Serial No. 801,706.

*To all whom it may concern:*

Be it known that GEORGE D. HOPPES, a citizen of the United States, residing at Springfield, in the county of Clark and State of Ohio, have invented certain new and useful Improvements in Trolley-Replacers; and I do hereby declare the following to be a full, clear, and exact description of the invention, such as will enable others skilled in the art to which it appertains to make and use the same.

This invention relates to new and useful improvements in trolley replacers and has for its object the provision of such a device which is adapted to automatically replace a trolley wheel in position on the trolley wire should the same become dislodged.

Another object of my invention is the provision of a means by which the trolley wheel and other mechanism is supported.

A still further object of the invention is the provision of a novel means whereby the coöperating wheels are held yieldingly against the trolley wheel support.

With the above and other objects in view I will now proceed to describe the invention in the following specification and accompanying drawings, in which, Figure 1 is a rear view of a trolley wheel showing the improved attachment as it would appear when in place, one portion of said attachment being in section to more clearly illustrate the interior mechanism thereof, and Fig. 2 is a detail sectional view taken on line 2—2 of Fig. 1.

Referring more particularly to the drawings 1 indicates a trolley pole of the ordinary type, which is secured to a car in the usual manner. This trolley pole is preferably provided adjacent its upper end with the apertures 2 through which the bolts 3, or other securing means, are adapted to pass.

A suitable sleeve 4, having formed at its upper end at diametrically opposite points the outwardly extending arms 5, is provided and is adapted to be secured to the trolley pole by means of the bolts previously described. At the lower end of the sleeve 4 and formed integrally therewith are also provided the outwardly and upwardly extending arms 6 which join the arms 5 as clearly illustrated by the numeral 7. Extending upwardly from the ends of the arms 5 and 6 and at substantially right angles to the longitudinal plane of the arms 5 are also provided the portions 8, having the recesses 9 formed adjacent their upper extremities. Centrally located with relation to the longitudinal axes and adjacent the upper ends of the portions 8 are also provided the apertures 10 through which the ends of the axle of the trolley wheel are adapted to extend.

The axle, above referred to, which is indicated generally by the numeral 11, is preferably provided with the apertures 12 adjacent each end, through which the pins 13 are adapted to extend and thereby hold said axle in position. A U-shaped member 14, which is secured to the sleeve 4, as shown at 15, is provided and the upper ends of the arms of the U-shaped member preferably terminate in the enlarged portions 16. Centrally located apertures 17 are formed in the arms of the U-shaped member and are adapted to receive the axle 11 when the device is in use.

The trolley wheel which is indicated by the numeral 18 and formed in the usual manner, is rotatably mounted on the axle intermediate the arms of the U-shaped member 14, as will be clearly seen upon referring to Fig. 1.

Rotatably mounted on the axle 11 and intermediate the U-shaped member 14 and the portions 8 I preferably provide the cone-shaped wheels, indicated generally by the numeral 19. These cone shaped wheels are provided with the spiral grooves 20 which extend from the outer ends of said wheels to the inner ends thereof. The smaller diameters of the cone-shaped wheels are placed outwardly, as clearly illustrated, and provided with the inwardly extending cylindrical recesses 21, in which the compression coil springs 22 are adapted to seat when the device is in place. These coil springs 22 are adapted to abut the inner walls of the recesses and the other ends of said springs are adapted to abut the portions 8. Thus it will be seen that the inner ends of the cone-shaped wheels will be held yieldingly into engagement with the arms of the U-shaped member 14, thereby holding the inner flanges of the wheels 19 in close proximity to the trolley wheel 18.

It will be clearly seen from the foregoing that in use my improved trolley replacer may be secured to the end of a trolley pole of the ordinary type as clearly shown in the drawings, and should the wheel 18 jump from its position on the wire it will be apparent that by means of the spiral grooves 20 which extend around the cone-shaped wheels 19 it will be automatically replaced. Thus, it will be seen that should the trolley wheel jump from its position on the wire and either of the wheels 19 engage the wire through the action of the spiral grooves the trolley pole will travel across and the wheel 18 will be replaced in its normal position on the wire.

While in the foregoing I have shown and described the preferred embodiment of my invention I wish it to be understood that I may change the specific arrangement and combination of parts, without in any way departing from the spirit and scope of my invention, as defined in the appended claim.

What is claimed is:—

In a trolley replacer, a supporting frame adapted for detachable attachment to a trolley pole, an axle carried by said frame, a substantially U-shaped bracket detachably carried by said frame and having substantially semi-circular shaped enlargements formed upon the terminals of its legs, a trolley wheel carried by said axle intermediate of said legs and having its periphery in line with the edges of said substantially semi-circular enlargements, substantially cone shaped wheels mounted upon said axle and having their bases positioned in engagement with the outer surface of the legs of said bracket and the outer surface of said substantially semi-circular enlargements, the faces of said cone shaped wheels being of larger diameter than said trolley, said substantially cone shaped wheels being provided with peripheral spiral grooves leading to their bases, and means for holding said bases in engagement with the outer surface of said substantially semi-circular shaped enlargements and the legs of said brackets.

In testimony whereof I affix my signature in presence of two witnesses.

GEORGE D. HOPPES.

Witnesses:
 B. B. JONES,
 WALTER WELLS.